Dec. 17, 1968  B. RIBBACK  3,416,352
PRESS FOR DEFORMING PLASTIC STOCK
Filed Jan. 11, 1966

INVENTOR.
Bernd Ribback
BY his attorney
Hubert R. Howson

United States Patent Office 3,416,352
Patented Dec. 17, 1968

3,416,352
PRESS FOR DEFORMING PLASTIC STOCK
Bernd Ribback, Unterm Bocksberg, Wasserbillig,
Luxembourg
Filed Jan. 11, 1966, Ser. No. 519,981
Claims priority, application Germany, Jan. 29, 1965,
R 29,935
8 Claims. (Cl. 72—402)

ABSTRACT OF THE DISCLOSURE

The press has a ring to actuate same and cam surfaces inside the ring.

The invention relates to a press or the like which deforms materials or stock presented to it in the plastic or flowable state. More particularly, the invention pertains to that class of such devices which commonly have spring-loaded deforming tool members that are disposed around a machine head. The tool members of this class of machine commonly are driven radially toward the central longitudinal axis of such a machine head to effect deformation of a workpiece mounted in that machine head. The radial motion is imparted by a roller-bearing-mounted rotating cage. As the rollers and cage rotate, the spring-loaded tool members are forced inward to effect deformation.

The known constructions of the subject class of machine operate at very high noise evels. Furthermore, great wear occurs rapidly in these embodiments. During even a relatively short period of operation a considerable clearance or gap develops between the rollers and their track or race surfaces. This gap causes the rollers to contact the tool members with hammerlike shock or impact, which itself adds considerably to the already very high noise level. Nor of less importance is the fact that as this wear increases, tool motion and thus accuracy of deformation, becomes less and less precise.

Efforts to eliminate the above recited drawbacks have included use of lever-type transmissions which drive the deforming tool members. These constructions have been of no avail. The levers and supporting bearings of such designs are subject to extreme bending stresses. Elements of the equipment have been found to give or yield elastically, under these stresses, which development significantly impairs the quality of the operation of the deforming press.

An object of the invention is to provide a machine of the subject class that is so designed and constructed as to eliminate the above described drawbacks.

Another object of the invention is to provide a machine of the subject class which operates free from centrifugal force stresses.

These and other objects and advantages are achieved by assembling the invention in combination with a stationary housing containing cage and roller structure, with a crank and lever-type transmission in one embodiment, and a reciprocating hydraulic drive in a second embodiment. In both of these embodiments four structural features disclose the novelty and character of the invention:

(1) force-exerting members disposed between the deforming tool members and a rotatable annulus or ring member;

(2) restriction of the design of the force-exerting members to the toggle principle, with pivot mounts for the toggle-type force-exerting members at cam surfaces spaced around the ring member;

(3) ring member drive mechanism which provides only oscillatory motion therefor;

(4) and limitation of such oscillatory motion to a certain function of the length of the toggle-type force-exerting members.

In the accompanying drawings

Figure 1:
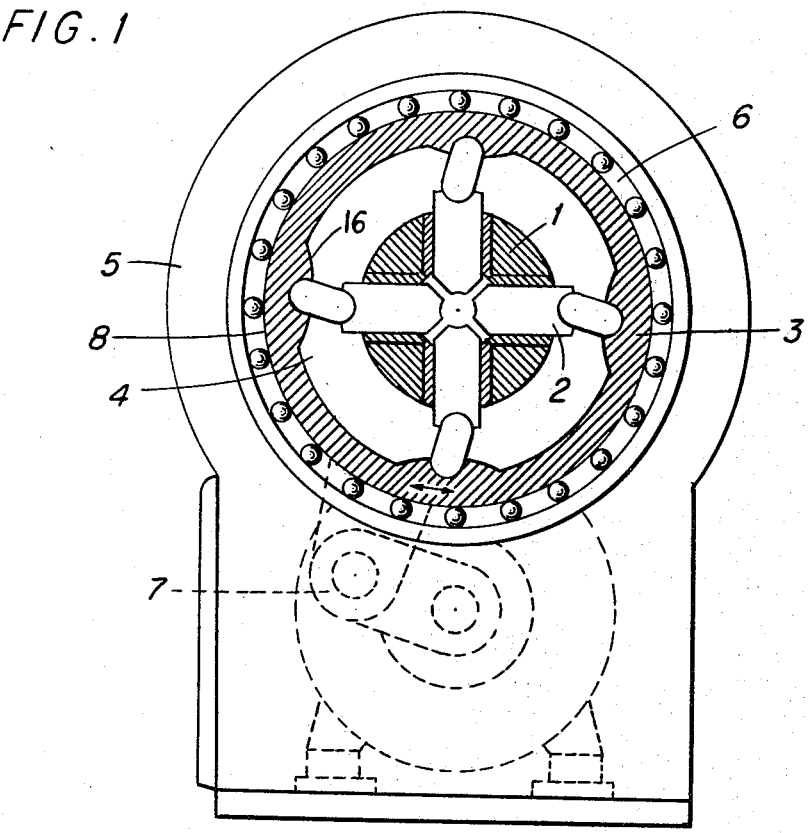
FIGURE 1 is a front elevation schematic view of a machine of the subject class, including the novel structure of the invention and showing (in section) an embodiment using a crank and lever transmission for a drive mechanism.

In FIG. 1 of the drawings deforming tool members 2 are mounted for movement in radial directions within machine tool head 1. Ring member 3 is rotatably disposed within tool housing 5 by means of roller bearing structure or race 6. As shown in FIGURE 1 crank and lever drive 7 relates the usual power source to the annulus or ring member 3 and provides oscillatory motion of that ring member.

The force-exerting members 4, hereinafter called toggle levers pivot mounted at 8 connect annulus or ring 3 at the camming surfaces 16 thereof with deforming tool members 2. The oscillating motion of the ring 3—which ring describes increments of arc as it moves—is limited as a function of the length of the levers 4. The principle involved is that of maintaining the members 2, 3 and 4 always in contact.

Figure 2:
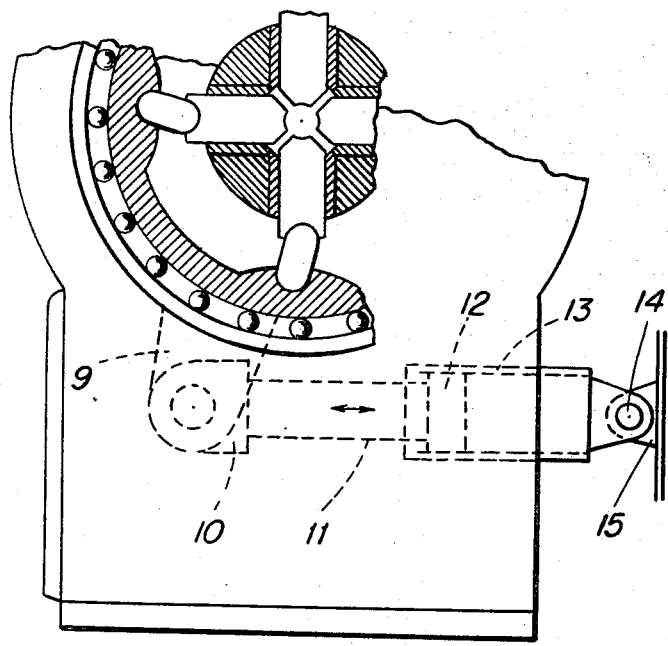
FIGURE 2 is a partly cut-away front elevation schematic view of the invention showing (in section) the second embodiment using a reciprocating hydraulic device for a drive mechanism.

FIGURE 2 discloses the embodiment of the invention driven by means of a reciprocating hydraulic device. This embodiment utilizes lever arm 9 relating annulus 3 to piston rod 11 by way of articulated connector 10. Said rod 11 connects to piston 12 which moves within cylinder 13 in response to fluid medium brought to bear against the piston in a conventional manner. Cylinder 13 is connected at its closed end 14 to stationary thrust bearing 15.

Structural details of the invention having been set forth above, attention is now drawn to operating details of the invention. Turning first to FIGURE 1, the lever-crank structure 7 causes annulus 3 to rotate a short distance in one direction; then a short distance in the opposite direction; then to repeat the cycle; and so on. The tool members accomplish workpiece deformation as they each describe reciprocatory motion radially of the machine head, because of the above described structure. During each motion of the ring the deforming members 2, the toggle levers 4 and the ring itself are all in constant engagement. The force brought to bear upon the deforming members 2 is determined by the position of the toggle levers 4 about their pivot points 8 relative to the tool members 2, which position in turn is determined by the relative position of the toggle levers and the raised or camming surfaces 16 of the ring 3. Whatever these positions be, whether they be mid-cycle, pre-cycle, or post-cycle positions of the three sets of elements recited, these elements are always in contact. This manifestation of the "continuous engagement" principle, utilizing toggle action and oscillating ring motion pivotally actuating the toggle levers provides noiseless operation of the press. This also means there is none of the hammerlike shock or impact so prevalent in previous structures of this class of machine. Indeed, the present configuration also eliminates the elastic-yielding tendencies exhibited during operation by various elements of predecessor structures.

The FIGURE 2 embodiment discloses the invention equipped with an hydraulic mechanism to provide the oscillatory ring motion. The operation of this embodiment is the same as that of the FIGURE 1 embodiment except with reference to the basic drive, which the reciprocating cylinder, piston and rod structure 13, 12 and 11 respectively, provides, by known means.

Alternative structural features additional to those illustrated and described above may be considered. For instance, actuating ring member 3 may be mounted in a conventional slide-type of bearing instead of the roller bearing structure 6. This feature could be applied to either the FIGURE 1 or the FIGURE 2 embodiments. Utility of the FIGURE 2 embodiment could be enhanced by connecting the disclosed hydraulic structure to an hydraulic circuit which includes a series of like structures that would simultaneously operate a series of presses.

The foregoing structure operates without appreciable centrifugal force, and wear stress is thus reduced, because the oscillatory nature of the rotary motion prevents build-up of centrifugal force.

By utilizing the invention as above described and below claimed, an operator is enabled to produce precise deformations of stock which satisfactorily shape tubing over internal mandrels, for example, to make tapered shafts; internal formation of teeth; and barrels for firearms.

Modifications of the invention other than those disclosed above may occur to those normally skilled in the art. Such modifications are understood to come within the ambit of the specification above, the drawings herewith, and the claims below.

I claim:

1. A materials deforming press including a housing,
a machine tool head in the housing to secure a workpiece,
and deforming tool members associated with the tool head,
in combination with tool member actuating means comprising a ring within the housing and cam means inside and spaced around the ring,
force-exerting members in continuous engagement with the tool members and the tool member actuating means,
and transmission drive mechanism connected to the tool member actuating means.

2. A materials deforming press as in claim 1
in which the tool member actuating means is a ring, and cam surfaces on the ring spaced around the ring an associated with the force-exerting members.

3. A materials deforming press as in claim 2
in which the transmission drive mechanism provides oscillatory motion of the ring.

4. A materials deforming press as in claim 3 in which the force-exerting members are designed as toggle levers.

5. A materials deforming press as in claim 4
in which each motion of the ring is limited as a function of the length of the toggle levers.

6. A materials deforming press as in claim 5
in which the transmission drive mechanism is a reciprocating hydraulic device pivotally connected to the ring.

7. A materials deforming press as in claim 6
in which the reciprocating hydraulic device is one of a plurality of like devices connected in circuit and each such device drives a press of the character claimed.

8. A flowable materials deforming press including
a stationary housing,
a machine tool head in the housing in which to secure a workpiece, and
deforming tool members so disposed within the machine tool head as to be movable radially of a secured workpiece,
in combination with a ring disposed within the housing on roller bearing races,
cam surfaces on said ring,
toggle levers pivotally mounted at the cam surfaces of the ring and in constant engagement with the cam surfaces and the deforming tool members, and
crank and lever drive and transmission mechanism designed to oscillate the ring back and forth through increments of arc limited as a function of the length of the toggle levers.

References Cited
UNITED STATES PATENTS

| | | | |
|---|---|---|---|
| 758,195 | 4/1904 | Schweinert et al. | 72—402 |
| 1,102,818 | 7/1914 | Tassey | 72—407 |

CHARLES W. LANHAM, *Primary Examiner.*

R. D. GREFE, *Assistant Examiner.*

U.S. Cl. X.R.

72—450